United States Patent [19]

Cambier et al.

[11] 4,412,278

[45] Oct. 25, 1983

[54] AC-TO-DC CONVERTER USING POLARIZED INPUT ISOLATION CAPACITORS

[75] Inventors: Graig S. Cambier, Louisville; Lawrence P. Trubell, Longmont, both of Colo.

[73] Assignee: International Business Machines Corporation, Armonk, N.Y.

[21] Appl. No.: 338,927

[22] Filed: Jan. 12, 1982

[51] Int. Cl.³ .............................................. H02M 7/06
[52] U.S. Cl. ...................................... 363/126; 363/53
[58] Field of Search .............................. 363/39, 44–48, 363/50, 52, 125, 126, 69, 70, 53

[56] References Cited

U.S. PATENT DOCUMENTS

| | | | |
|---|---|---|---|
| 2,539,100 | 1/1951 | Rado | 363/50 |
| 3,001,120 | 9/1961 | Bereskin | 363/126 |
| 3,286,171 | 11/1966 | Fluegel et al. | 324/60 |
| 3,688,179 | 8/1972 | Burns | 363/48 |
| 3,942,095 | 3/1976 | Togneri et al. | 324/119 |

FOREIGN PATENT DOCUMENTS

| | | | |
|---|---|---|---|
| 1934980 | 10/1979 | Fed. Rep. of Germany | 363/45 |
| 843843 | 8/1960 | United Kingdom | 363/126 |
| 180243 | 5/1966 | U.S.S.R. | 363/53 |
| 584303 | 12/1977 | U.S.S.R. | 363/26 |
| 775843 | 10/1980 | U.S.S.R. | 363/48 |

OTHER PUBLICATIONS

Practical Electronics, vol. 11, No. 11, pp. 914–916, Nov. 1975.
IBM Technical Disclosure Bulletin, "Transformerless Phase Controlled DC Supply," J. Saia, Mar. 1971, pp. 3179–3180.

Primary Examiner—William H. Beha, Jr.
Attorney, Agent, or Firm—Carl M. Wright

[57] ABSTRACT

Current-return diodes around input capacitors permits the use of polarized isolation capacitors in a.c.-to-d.c. power supplies. By providing input diodes, the use of more efficient polarized (d.c.) capacitors can be used as the a.c. isolation element, providing surge limiting protection and larger currents at reduced costs.

3 Claims, 3 Drawing Figures

AC-TO-DC CONVERTER USING POLARIZED INPUT ISOLATION CAPACITORS

TECHNICAL FIELD

This invention relates to power supplies for supplying direct current power from an alternating current power source. It relates particularly to the use of power supplies using input isolation capacitors.

A d.c. producing power supply, especially when operating from an alternating current source without an intervening transformer, must be protected against surges. This has been done in the prior art by the use of large wattage resistors which dissipate part of the power as heat or by the use of phase control devices which add to the complexity and cost of the system.

Such power supplies in the prior art have required the use of nonpolarized, i.e., a.c., capacitors. Polarized capacitors, however, are less costly and, due to the recent technological developments, have become much more efficient. The internal resistance is less and a large capacitance can be packaged in a smaller volume. Therefore, it is a major disadvantage to have to use nonpolarized capacitors, which are more expensive and have lower capacitance values. The use of back-to-back polarized capacitors as a substitute for nonpolarized capacitors is not desirable because eventually an imbalance occurs between the capacitors, causing catastrophic failure of both. Furthermore, the effective capacitance value is reduced by series capacitors and the working voltage must be increased.

BACKGROUND ART

The use of input capacitors as isolation elements in transformerless a.c.-to-d.c. converters is well known. Bereskin (U.S. Pat. No. 3,001,120), for example, shows the use of such capacitors. His circuit, however, requires the use of surge resistors and nonpolarized capacitors.

In an article by J. Saia, "Transformerless Phase Controlled Power Supply," *IBM Technical Disclosure Bulletin*, Vol. 13, No. 10, March 1971, pp. 3179–3180, a transformerless a.c.-to-d.c. power supply is shown.

Other references showing the use of input isolation capacitors in a.c.-to-d.c. converters are U.S. Pat. Nos. 3,286,171 (Fluegel et al.) and 3,942,095 (Togneri et al.).

None of these prior art references, however, show or suggest the manner by which polarized capacitors could be used in the a.c. input circuit.

The purpose of the present invention is to use polarized input isolation capacitors which can be of large enough value to provide surge limitations that required large, heat-dissipating resistors in the prior art.

DISCLOSURE OF THE INVENTION

In accordance with the present invention, a d.c. power supply operating from an a.c. source uses a full-wave rectifier circuit to produce pulsating d.c. from the input a.c. The a.c. source is coupled to the input terminals of the full-wave rectifier circuit by polarized input isolation capacitors. To prevent a voltage polarity reversal around the capacitor terminals, a pair of diodes, i.e., single-wave rectifiers, are coupled to the a.c. input side of the capacitors and to one of the output terminals of the full-wave rectifier circuit. The full-wave rectifier output terminal and diode polarity are determined so that the anode-to-cathode voltage of the input capacitors never becomes negative.

This arrangement provides reduced power dissipating, small size, and lower cost. The use of the polarized, i.e., d.c., capacitors with their higher capacitance results in higher output current at lower cost.

Furthermore, the full-wave rectifier with double capacitor input permits the d.c. supply to be referenced to the same bus as the load. The initial input surge current is limited without using high wattage surge resistors, eliminating the wasteful dissipation associated with the use of such resistors.

A d.c. supply regulator can be operated at a lower d.c. voltage which allows the use of lower cost switching transistors. The d.c. supply can be short-circuited without burning out the rectifiers or fuses.

The circuit is ideal for flyback switching circuits and also for forward converters because the bulk supply can be matched to peak power requirements while providing short-circuit protection to the forward converter. Switching regulator bias voltages can be supplied without having to draw them from higher potential supplies through large wattage resistors.

For a particular load current, the capacitance values can be readily determined for a particular voltage. This, in effect, selects the operating point.

DETAILED DESCRIPTION

Figure 1:
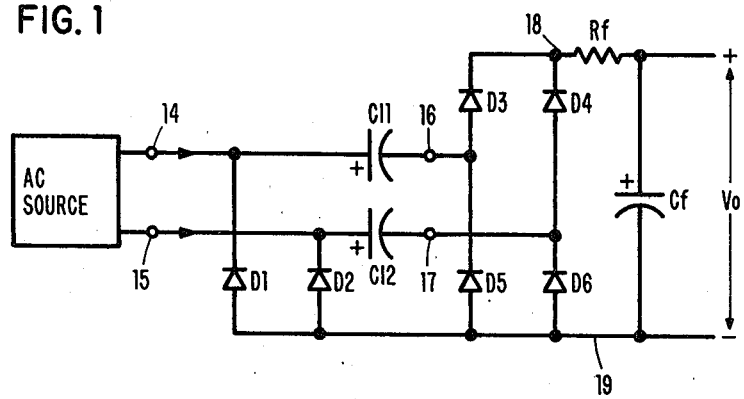
FIG. 1 is a circuit showing the use of the invention.

A preferred embodiment of the invention is shown in the drawing in FIG. 1. The input alternating-current power is coupled to a pair of input isolation capacitors CI1 and CI2 via a pair of alternating current input terminal 14 and 15. The output side of the isolation capacitors are coupled to a standard full-wave rectifier bridge comprising diodes D3-D6 via input terminals 16 and 17. The pulsating direct current from output terminals 18 and 19 from the full-wave rectifier bridge can be filtered by a low-pass filter comprised of Rf and Cf to produce a filtered pulsating direct-current voltage at the output Vo, which can be typically coupled to a regulator or directly to a load.

The input isolation capacitors CI1 and CI2 are polarized, i.e., direct-current type. For proper operation, the capacitors must operate so that their anode voltage—the voltage on the alternating-current input side in FIG. 1—never becomes negative with respect to the cathode voltage—the voltage on the full-wave rectifier side in FIG. 1. Since the input voltage is alternating between a positive and a negative peak value, the voltage across the input isolation capacitors would normally reverse, making it impossible to use polarized capacitors.

Figure 2:
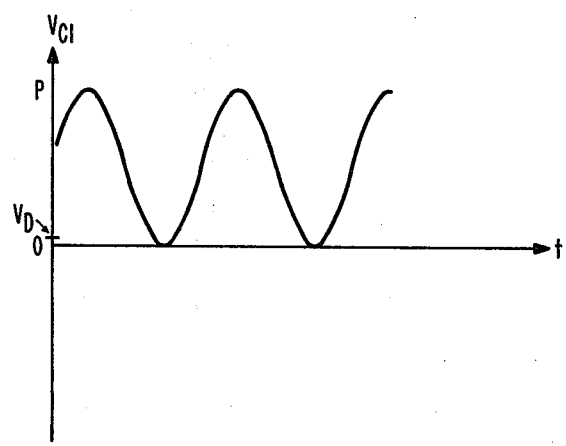
FIG. 2 is a plot of the voltage across the input capacitors with respect to time.

To prevent the voltage polarity reversal across the input isolation capacitors, the diodes D1 and D2 are added to the circuit. The effect of the addition of the diodes is to raise the input voltage at the anodes of the input isolation capacitors above ground on the negative peak as shown in FIG. 2. The diodes D1 and D2 actually conduct only at start-up time and in the presence of transients.

FIG. 2 shows the voltage across either CI1 or CI2 with respect to time. As the input voltage becomes negative to one of the input isolation capacitors CI1 or CI2, the associated diodes D1 or D2 conducts, causing the anode of the connected input isolation capacitor to be referenced to the ground or zero potential of the cathode side of the input isolation capacitors. That is, the diodes return live current around the input isolation capacitors when the voltage across the capacitors reaches a value of zero.

Figure 3:
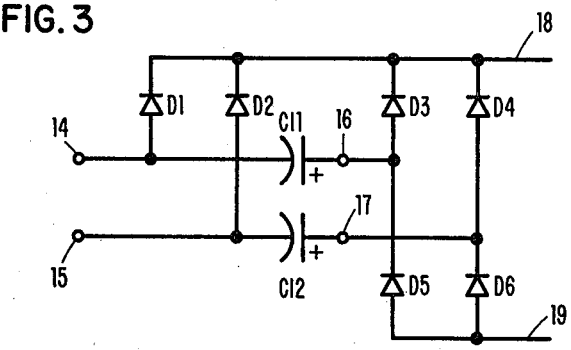
FIG. 3 is an alternative circuit configuration showing the use of the invention.

The diodes D1 and D2 can be coupled in an opposite sense to the positive output line and the polarity of the input isolation capacitors reversed. In such a configuration, shown in FIG. 3, the input side of the capacitors, now the cathode remain negative with respect to the output (anode) side.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a direct-current power supply operated from an alternating current source and having a pair of alternating current input terminal means for receiving input alternating current from said alternating current source and full-wave rectifier means for converting alternating current into full-wave pulsating direct current, said full-wave rectifier means having a pair of input terminal means for receiving alternating current and a pair of output terminal means for supplying pulsating direct current, the improvement comprising:

a pair of polarized input isolation capacitor means, having anode means and cathode means, each of said input capacitor means coupling a different one of said pair of alternating current input terminal means to a different one of said pair of input terminal means of said full-wave rectifier means; and a pair of single-wave rectifier means, each coupled to conduct current between the same one of said pair of output terminal means of said full-wave rectifier means and a different one of said pair of alternating current input terminal means.

2. The invention as claimed in claim 1 wherein said anode means of said input capacitor means is coupled to said alternating current input terminal means and said pair of single-wave rectifier means is coupled to conduct current from the more negative output terminal means of said pair of output terminal means of said full-wave rectifier means.

3. The invention as claimed in claim 1 wherein said cathode means of said input capacitor means is coupled to said alternating current input terminal means and said pair of single-wave rectifier means is coupled to conduct current from the more positive output terminal means of said pair of output terminal means of said full-wave rectifier means.

* * * * *